Patented Nov. 24, 1931

1,833,597

UNITED STATES PATENT OFFICE

FRANZ SEITZ, OF HAMBURG, GERMANY, ASSIGNOR TO THE FIRM C. H. BOEHRINGER SOHN, OF NIEDER-INGELHEIM-ON-THE-RHINE, GERMANY, A SOCIETY OF GERMANY

PROCESS FOR EXTRACTING THEOBROMINE FROM NATURAL PRODUCTS CONTAINING THEOBROMINE

No Drawing. Application filed July 23, 1929, Serial No. 380,471, and in Germany May 18, 1929.

The present invention relates to the extraction of theobromine from natural products containing theobromine, particularly cocoa and cocoa waste.

From the works of Roussau, Schaap and others it is known that theobromine can be extracted from cocoa waste and the like by treatment thereof with water, and preferably with alkaline earth hydroxides in excess in the form of alkaline earth salts of theobromine, which latter can then be further treated for obtaining theobromine, after separation of the dilute solution from the solid residues, for example by treatment with free acids.

When carrying out such processes in connection with finely ground initial substances there occurs the disadvantage that the material treated with alkaline earth hydroxide in excess and water can only be filtered with difficulty and slowly and rapidly tends to fill the pores of the filter.

According to a recent known process the operation is such that the natural products containing theobromine are intimately mixed in a state of fine subdivision with a considerable excess of alkaline earth hydroxide, adding to this mixture whilst continually stirring, a partial quantity of the water (1:1), so that an apparently dry mixture remains, whereupon the residual quantity of the water necessary for the extraction is added whilst continuing the stirring and preferably in a hot condition. The procedure is preferably such that the water containing material obtained by the preliminary treatment is preferably allowed to stand in the form of a thin layer for a long time, for example about twenty-four hours before adding the additional water.

According to the present invention the process is carried into effect whilst obtaining considerable advantages especially as regards the capability of filtration of the material. It has been found that the filtration can be considerably improved if the ground cocoa waste is first moistened alone with water thus forming a sticky, pasty mass, whereupon there is added the necessary lime either in the form of dry lime hydrate powder or ground calcined lime and after further mixing the powder which is dry to the touch is mixed whilst stirring with the quantity of water required for the extraction.

For the purpose of thoroughly moistening the pulverous initial material lime water or an extract containing theobromine and alkaline earth hydroxide may be used instead of water. In such cases, however, it is necessary to prevent the occurrence of an alkaline reaction.

The process is applicable to finely ground initial substances from which the fat has or has not been removed.

In carrying the process into effect on a commercial scale it has been found that the duration of filtration, when using very finely ground cocoa residues, requires only about one-third of the time required when operating according to the known processes. A particular advantage of the process resides in the fact that it enables the separation of the liquid from the solid residues to be effected in the simplest manner by decantation.

If, for example, the material prepared according to the known process hereinbefore described is allowed to settle in the dilute liquid the coarsest particles rapidly sink to the bottom, but above these there remains a turbid layer which does not form a sediment until after being allowed to stand for hours, and even then with obscure limits so that a layer of fine slime is deposited above the coarser particles and the liquid above this only becomes completely clear after being allowed to stand for some days.

If, however, the initial material is treated in accordance with the present invention the particles suspended in the liquid are deposited more uniformly and rapidly on the bottom. The limits are also sharply defined.

The sediment portion is granular and does not have a layer of slime. Also the finest particles in suspension are very rapidly deposited as sediment so that contrary to the known processes the solution at the top is completely clear after being allowed to stand for a short time.

Further investigations have shown that the speed of filtration or the speed of sedimentation can be increased by the addition of electrolytes. As such may be mentioned for example sulphuric acid, hydrochloric acid, magnesium sulphate, calcium chloride or the like. The addition of electrolytes is preferably effected shortly before filtration or decantation.

The separation may be effected in so-called glass retorts.

*Examples*

1. 100 kg. of finely ground cocoa waste are thoroughly moistened with 80 litres of water for fifteen minutes in a mixing device, then there are added 30 kg. of pulverized lime hydrate and mixing takes place for a further fifteen minutes. The mixed material is then mixed with 600 litres of water, preferably hot water, for a further twenty minutes, whereupon it is allowed to stand and settle. By a repeated stirring with fresh quantities of water it is possible to extract theobromine quantitatively from the cocoa waste. By using the enriching process on the counter-current principle such strong extracts can be obtained that the theobromine can be obtained from the extracts without evaporation in the usual manner by acidification.

2. Into the mixture, adapted for sedimentation, which for example consists of 100 kg. cocoa waste, 25 kg. lime hydrate and 700 litres water, there are introduced in thin streams whilst energetically stirring 5 litres of sulphuric acid (50 per cent) or 50 litres of a 10 per cent sodium sulphate solution or 10 litres of a 50 per cent magnesium chloride solution. A further treatment is effected in accordance with Example 1.

I claim:—

1. A process for extracting theobromine from natural products containing theobromine by treatment with calcium hydroxide in excess and water, consisting in first thoroughly moistening the ground initial material with an aqueous liquor without addition of solid substance containing alkaline earth oxides, mixing the thus formed sticky pasty mass with pulverulent lime, stirring the mixture thus obtained with water in a quantity necessary for extraction, separating the dilute extract from the residues and treating the extract so as to obtain theobromine.

2. A process for extracting theobromine from natural products containing theobromine by treatment with calcium hydroxide in excess and water, consisting in first thoroughly moistening the ground initial material with an aqueous liquor without addition of solid substances containing alkaline earth oxides, mixing the thus formed sticky pasty mass with pulverulent calcined lime, stirring the mixture thus obtained with water in a quantity necessary for extraction, separating the dilute extract from the residue and treating the extract so as to obtain theobromine.

3. A process for extracting theobromine from natural products containing theobromine by treatment with calcium hydroxide in excess and water, consisting in first thoroughly moistening the ground initial material with a dilute solution of calcium hydroxide without addition of solid substances containing alkaline earth oxides, mixing the thus formed sticky pasty mass with pulverulent lime, stirring the mixture thus obtained with water in a quantity necessary for extraction, separating the dilute extract from the residues and treating the extract so as to obtain theobromine.

4. A process for extracting theobromine from natural products containing theobromine by treatment with calcium hydroxide in excess and water, consisting in first thoroughly moistening the ground initial material with a dilute solution of calcium hydroxide containing theobromine without addition of solid substances containing alkaline earth oxides, mixing the thus formed sticky pasty mass with pulverulent lime, stirring the mixture thus obtained with water in a quantity necessary for extraction, separating the dilute extract from the residues and treating the extract so as to obtain theobromine.

5. A process for extracting theobromine from natural products containing theobromine by treatment with calcium hydroxide in excess and water, consisting in first thoroughly moistening the ground initial material with an aqueous liquor without addition of solid substances containing alkaline earth oxides, mixing the thus formed sticky pasty mass with pulverulent lime, stirring the mixture thus obtained with hot water in a quantity necessary for extraction, separating the dilute extract from the residues and treating the extract so as to obtain theobromine.

6. A process for extracting theobromine from natural products containing theobromine by treatment with calcium hydroxide in excess and water, consisting in first thoroughly moistening the ground initial material with an aqueous liquor without addition of solid substances containing alkaline earth oxides, mixing the thus formed sticky pasty mass with pulverulent lime, stirring the mixture thus obtained with water in a quantity necessary for extraction, separating the dilute extract from the residue by decantation and treating the extract so as to obtain theobromine.

7. A process for extracting theobromine from natural products containing theobromine by treatment with calcium hydroxide in excess and water, consisting in first thoroughly moistening the ground initial material with an aqueous liquor without addition of solid substances containing alkaline earth oxides, mixing the thus formed sticky pasty mass with pulverulent lime, stirring the mixture thus obtained with water in a quantity necessary for extraction with addition of an electrolyte, separating the dilute extract from the residues and treating the extract so as to obtain theobromine.

8. A process for extracting theobromine from natural products containing theobromine by treatment with calcium hydroxide in excess and water, consisting in first thoroughly moistening the ground initial material with an aqueous liquor without addition of solid substances containing alkaline earth oxides, mixing the thus formed sticky pasty mass with pulverulent lime, stirring the mixture thus obtained with water in a quantity necessary for extraction with addition of an acid, separating the dilute extract from the residues and treating the extract so as to obtain theobromine.

In testimony whereof I affix my signature.

FRANZ SEITZ.